DATA PROCESSING EQUIPMENT

Filed Nov. 16, 1965

Inventors
GEORGE A. HOWELLS
GEOFFREY A. HUNT
By [signature]
Attorney

Inventors
GEORGE A. HOWELLS
GEOFFREY A. HUNT
By Percy P. Lantzy
Attorney

Inventors
GEORGE A. HOWELLS
GEOFFREY A. HUNT
By [signature]
Attorney

Inventors
GEORGE A. HOWELLS
GEOFFREY A. HUNT
By [signature]
Attorney

United States Patent Office 3,421,148

Patented Jan. 7, 1969

3,421,148

DATA PROCESSING EQUIPMENT

George Aneurin Howells and Geoffrey Allen Hunt, Aldwych, London, England, assignors to International Standard Electric Corporation, New York, N.Y., a corporation of Delaware Filed Nov. 16, 1965, Ser. No. 525,000
Claims priority, application Great Britain, Nov. 16, 1964, 46,533/64
U.S. Cl. 340—172.5 4 Claims
Int. Cl. G11b *13/00*

ABSTRACT OF THE DISCLOSURE

Digital data processing equipment, utilizing binary coded data in the form of an error detecting and correcting code, wherein any detected single errors are automatically corrected by the complementation of all error-free digits, with the erroneous digit being inhibited from complementation, and there is included a digit also subject to error detection and correction which indicates whether the accompanying digits are in normal or complemented form.

This invention relates to data processing equipment, and in particular to electronic digital computers.

The design of data processing equipments is directed towards one or more specific requirements, such as speed of operation, data handling capacity, flexibility of operation, size and reliability. The development of any of the first four requirements is usually consistent with an increased reliability problem.

A digital data processing equipment such as a computer comprises three essentials:

(1) Data transfer from one section of the equipment to another.
(2) Data processing function equipment, i.e. adding, translating checking.
(3) Data storage.

It will be assumed for the purposes of this specification that in any portion of a data processing equipment not more than one fault will appear at any one time. Experience has indicated that this is a reasonable assumption to make, providing that rapid rectification is possible and also that if such single faults can be averted or circumvented the operation of the equipment need not be immediately interrupted. This last point is based on the assumption that faults are comparatively infrequent and therefore the probability of a second related fault occurring before the end of the current program may be small, and that an equipment shutdown can thereby be deferred.

It is also assumed that, in a complex data processing equipment such as an electronic computer, provided the data originally supplied to the equipment is correct then any error in the data flowing at any point in the equipment arises out of a fault in the equipment. It is not practical, if indeed possible, to check the operation of each component other than by examining the data at various points in the data flow and detecting errors in the data which are indicative of a fault in the equipment. Provided that the data is in a suitable form, such a binary code including a Hamming check, it is also possible to locate accurately the position of the error in the data and to initiate the appropriate correction.

According to the invention there is provided a data processing equipment including means for examining the output of a portion of the equipment, means for detecting an error in the output, means for converting all error-free elements of the data associated with that portion of the equipment into an alternative form in which any element previously in error will now appear error-free.

In a preferred embodiment of the invention there is provided a data processing equipment handling binary coded digital data, in the form of an error detecting and correcting code, including means for examining the binary digital output of a register, means for detecting an error in one of the output digits, means for complementing (as hereinafter defined) all error-free digits in the register.

The term "complementing" as used in this specification refers to the process of reversing the digital value of each individual digit in a portion of digital data. Thus in a binary digital code group all the "1's" are turned into "0's" and vice versa when the code group is complemented A code group 1101 is said to be the complement of the group 0010.

The above and other features of the invention will become more readily apparent in the following description of the invention with reference to the accompanying drawings, in which.

Figure 2:
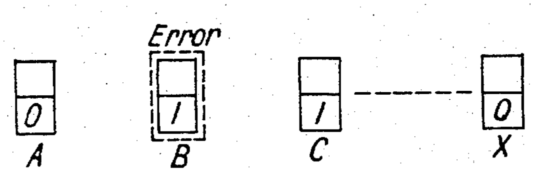
FIG. 2 illustrates the register of FIG. 1 with one faulty unit.
Figure 3:
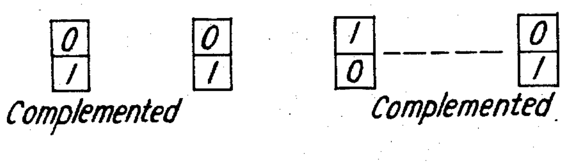
Figure 6:
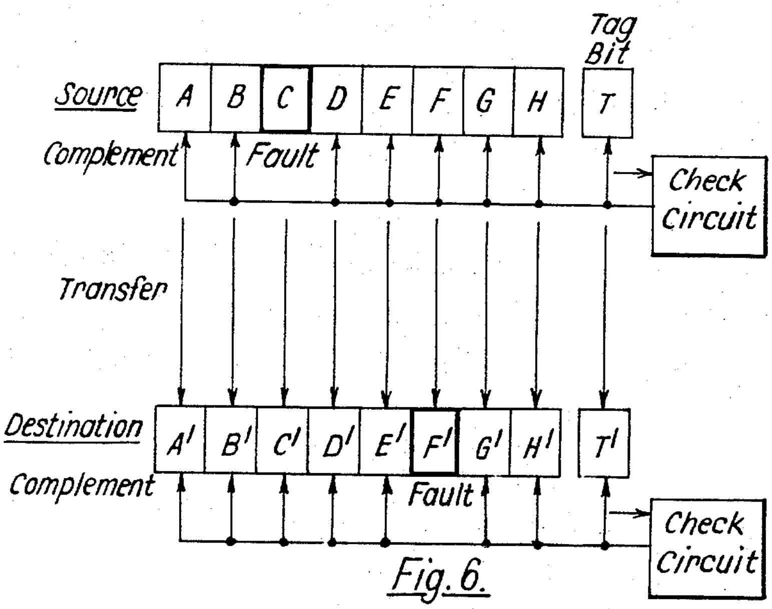
Figure 4:
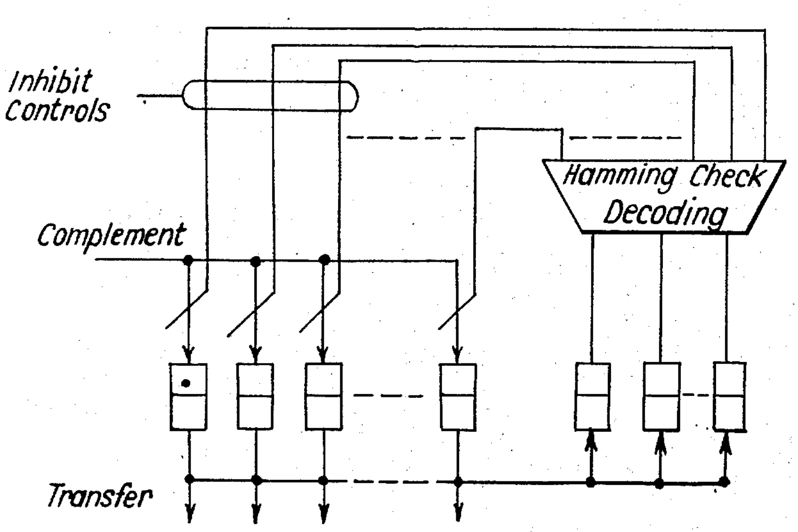
Figure 5:
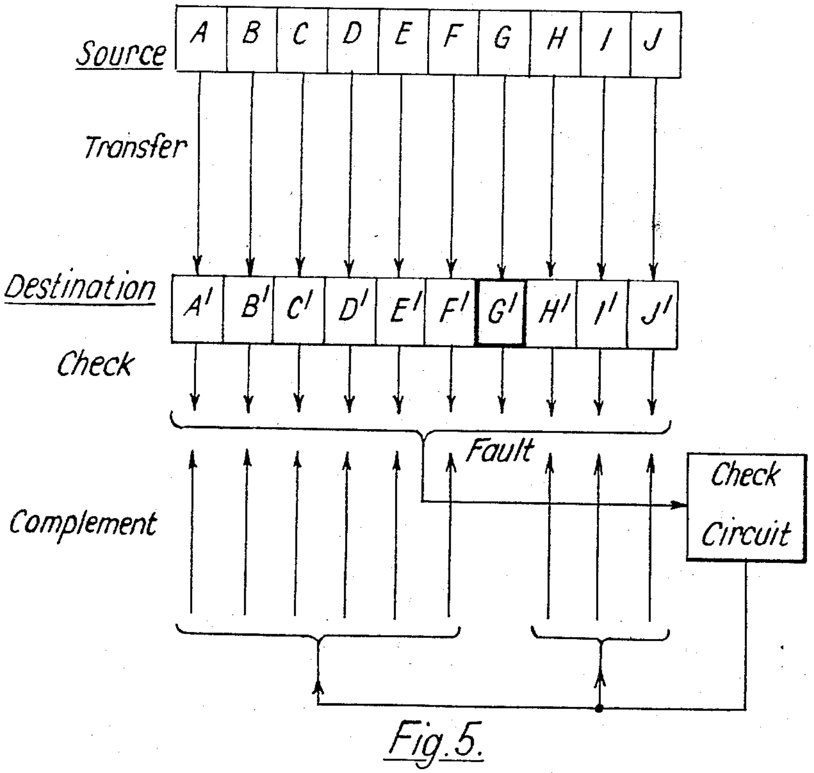
Figure 7:
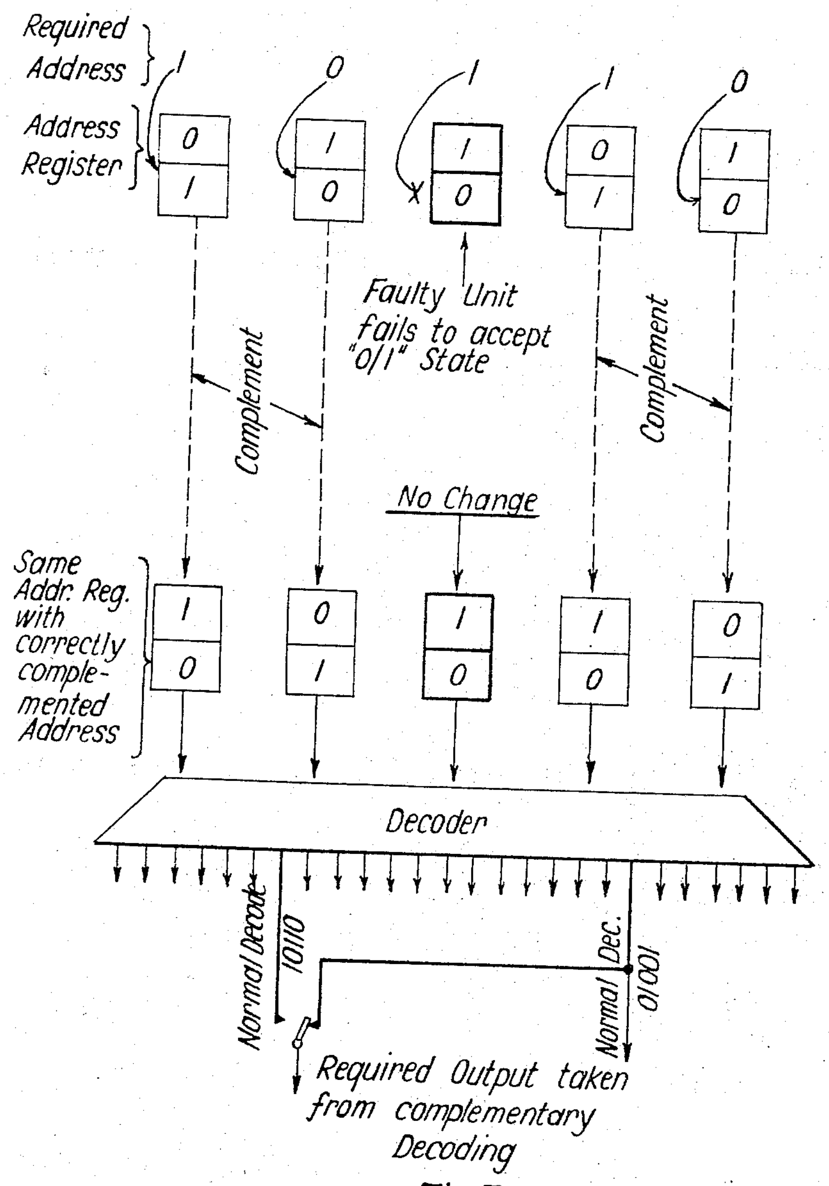

FIG. 3 illustrates the register of FIG. 2 with all the fault free bistable units complemented, FIG. 4 illustrates an arrangement for checking the contents of a register and for complementing all error free units, FIG. 5 illustrates an arrangement in which errors arising in either a "source" or "destination" register are corrected in the "destination" register, FIG. 6 illustrates an arrangement in which single faults in succeeding registers are corrected by complementation, FIG. 7 illustrates an arrangement for correcting a fault in an address register for a decoder.

Figure 8:
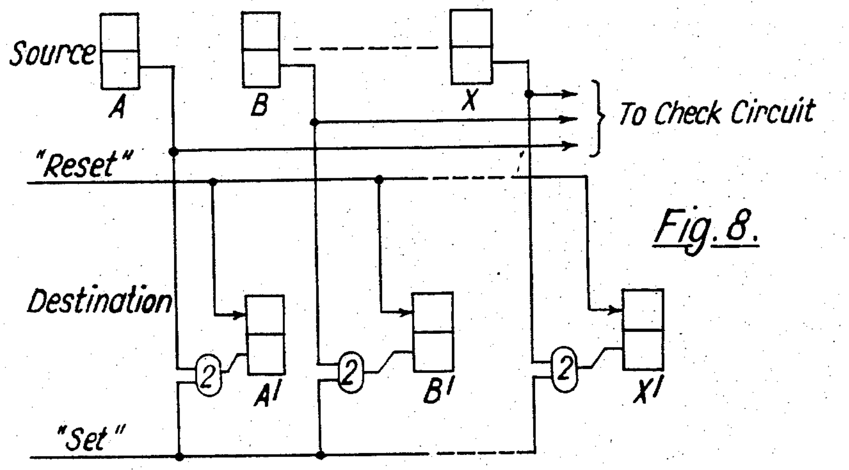
Figure 9:
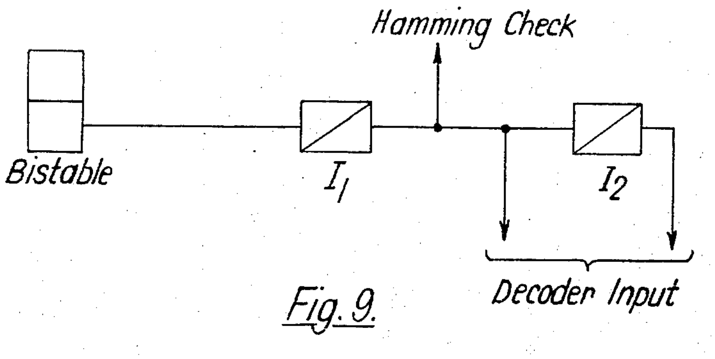

FIG. 8 illustrates an arrangement for transferring data from one register to another when the latter has been reset prior to being set by the transferred data, and FIG. 9 illustrates an arrangement for using both normal and complemented outputs from a register.

Figure 1:
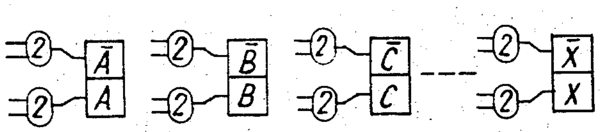
FIG. 1 illustrates a register composed of bistable elements with input gating.

In FIG. 1 a register composed of bistable units A, B, C, . . . X is shown together with elementary input gating. This register is capable of holding data in binary digital form, i.e. if $A=1$ then $\bar{A}=0$, and the bistable can be set to either $A-\bar{A}$ or $\bar{A}-A$.

It is possible for a fault to develop in any bistable, such that it "locks" in a fixed state ("0–1" or "1–0") and is not capable of being switched to its complementary form when required.

A similar effect can result from a fault in the input gating to such an element, when the required setting pulse is not generated.

Suppose bistable B in FIG. 1 is an element in which such a fault appears, and that it locks into the state $B=1$, $\bar{B}=0$. Then if the register were required to hold, for example, the information:

ABC ---------------------------------------- X
011 ---------------------------------------- 0 no error would be detected, and none in fact would arise, since the element B is locked in the correct sense. If, however, B is required to switch to the "0" state—for example when the register is required to be set as follows:

ABC ---------------------------------------- X
001 ---------------------------------------- 0 then an error will arise as the data actually recorded will be:

| | |
|---|---|
| ABC | X |
| 011 | 0 |

FIG. 2 shows the full state of the register with the faulty unit B locked into the incorrect state.

If the fault had been simply an input gating fault, it is possible that additional gating would have been capable of switching bistable B to the required state, after detection and location of the error. But this is not a general solution capable of dealing with the case where the bistable itself has failed and locked into one fixed state.

FIG. 3, however, shown that if all the *remaining* (correctly functioning) bistables can be complemented when an error is detected, the result will be that the register will then contain correctly complemented data throughout.

Provided that an indication is given to subsequent stages in the data transfer system that complementing has taken place, and that appropriate arrangements are then made, information originating from such a faulty register can be processed without error.

It is thus necessary to be able to detect an element containing incorrect data. A preferred solution is to attach check bits to data in transit (for example, in the form of a Hamming Code) and to provide additional positions for these in destination registers. Such a code can indicate (i) that an error in the data or check bits exists, and thus initiate the complementing operation, and (ii) which particular element is in error, in order to inhibit the complementing signal for that element. FIG. 4 illustrates this arrangement. This last-mentioned inhibiting signal is necessary because, of course, it will not be known positively that the bistable is incapable of switching when the complementing signal is applied.

Three cases will now be considered as examples.

In FIG. 5 a source register composed of bistable units A, B, C, . . . J is assumed to be transferring data to a "destination" register composed of bistable units $A^1$, $B^1$, $C^1$, . . . $J^1$. The destination register is provided with a checking and complementing control as described for FIG. 4.

In the first example it is assumed that the destination register bistable $G^1$ exhibits an error arising out of a fault in bistable G in the source register. A check on the output of the destination register generates a signal causing all the destination units except $G^1$ to be complemented, so that the destination register will contain correct, but complemented, information. In this example the normal Hamming correction—complementing the *erroneous* digit in the destination register—could have been applied.

In fact the proposed solution is more general in that a fault in the destination equipment can also be circumvented in a similar way. In this second example, if the destination unit $G^1$ is faulty it cannot be corrected by signals attempting to control $G^1$. Therefore all the other units are complemented to give correctly complemented data throughout, as in the case of the source fault.

In FIG. 6 an extension of this principle is shown, in which an additional "tag" bit T is appended to the data-plus-check-bit register. The function of the tag bit in the third example is to indicate the phase ("Normal" or "complemented") of the contents of the remainder of the register. The tag bit is also within the scope of the check bits, and they are thus able to indicate whether the tag bit itself is in error or correctly recorded. In this case it will be seen that a fault in the source register can be circumvented by complementing all other units, as previously described (the tag bit being no exception); the complemented data is then transferred to a destination register which can also tolerate a fault in any single unit of its own.

FIG. 7 illustrates the complementing principle applied to a decoder, in which the required function is obtained from either the "normal" or "complementary" decoder outputs, dependent on whether the input data is in normal or complemented form.

Since it is possible that a bistable may lock in the "0–0" or "1–1" state, it is preferable to arrange transfers between registers on the "reset-set" basis, rather than as a "double-sided" transfer, the check digits being controlled by that bistable output which is used to determine the data to be transferred; FIG. 8 illustrates this. Before data is transferred from the source bistables A, B . . . X bistables $A^1$, $B^1$, . . . $X^1$ in the destination are all reset to a predetermined condition by a "reset" pulse. Then the input gates *a*, *b*, . . . *x* are opened by the "setting" pulse and the data is transferred.

In the case where it is necessary to use both normal and complementary phases of a bistable register, for example, at the input to a decoder, it is preferable to buffer one output of each bistable with two inverting stages as illustrated in FIG. 9. Here, it is possible for either of the inverters to fail.

Whereas a bistable circuit in many cases consists basically of two inverter circuits, cross-coupled the additional inverters of FIG. 5 have no attached trigger circuits and can have separate physical locations and power supplies; they are less likely to exhibit the condition where the two outputs are permanently locked in the same phase.

If the first inverter should fail then the Hamming check can detect and correct an error in the same way as for a bistable fault, i.e. by complementing of the register bistables. In the event of the first inverter functioning correctly while a fault existed in the second ($I_2$), both inverters could have identical outputs ("0—0" or "1—1"). This would not be indicated by the Hamming check, but would be indicated by a "$1/n$" decoder output detection circuit. This could initiate complementation of *all* bistable units (none being inhibited by the Hamming check circuit output controls) and again correctly complemented information would result.

The use of the check digits in determining the position of, and correcting for, any error in the data may be effectively accomplished by decoding the indication of $n$ Hamming check bits into a "complementing" signal and $2^n-1$ "inhibit complementing" signals (for the $2^n-1$ possible error positions). It is possible for such a device to be subject to a fault which causes a spurious "correcting" signal to be generated. This can be guarded against by the incorporation of an additional parity bit, covering all data in the register. On the assumption made previously that not more than one fault is present at any time, if such a fault exists it will be indicated by both the parity and Hamming checks. If the Hamming check indicates an error and the parity check does not, the fault must be in the parity circuit. Thus the parity output can be used as a safeguard to inhibit spurious complementing signals.

It is to be understood that the foregoing description of specific examples of this invention is made by way of example only and is not to be considered as a limitation on its scope.

What we claim is:

1. Digital data processing equipment wherein binary coded digital data is handled in a parallel mode in the form of an error detecting and correcting code, the nature of the code being such that all the binary elements including those forming check bits are checkable, the equipment including means for examining the binary digital contents of a register, means for performing a checking operation on the result of the examination and means for complementing all error-free digits in the register.

2. Data processing equipment according to claim 1 including means for generating an additional digit included in the data the condition of which signifies whether or not the accompanying data is complemented.

3. Data processing equipment according to claim 1 including means for re-setting a register to a predetermined condition before the transfer of data to that register is affected.

4. Data processing equipment according to claim 1, including first and second digital data inverters connected in series with one output of a decoder address register bistable, means for detecting an error in the digital output of the first inverter and means for transferring the output of either inverter to the address decoder input.

References Cited

UNITED STATES PATENTS

| | | | |
|---|---|---|---|
| 3,227,999 | 1/1966 | Hagelbarger | 340—146.1 |
| 3,273,121 | 9/1966 | Taylor | 340—146.1 |
| 3,353,155 | 11/1967 | Chien et al. | 340—146.1 |

PAUL J. HENON, *Primary Examiner.*

R. M. RICKERT, *Assistant Examiner.*

U.S. Cl. X.R.

340—146.1